United States Patent [19]
di Priolo et al.

[11] Patent Number: 5,322,042
[45] Date of Patent: Jun. 21, 1994

[54] COMBUSTION CHAMBER FOR INTERNAL COMBUSTION ENGINE AND PROCESS OF COMBUSTION USING FUEL RADICAL SPECIES

[75] Inventors: Carlo L. di Priolo, Chester; Theodore P. Naydan, Severna Park; Charles C. Failla, Annapolis; Andrew A. Pouring, Edgewater; William P. McCowan, Queenstown; Brad R. Bopp, Annapolis, all of Md.

[73] Assignee: Sonex Research, Inc., Annapolis, Md.

[21] Appl. No.: 18,564

[22] Filed: Feb. 17, 1993

Related U.S. Application Data

[63] Continuation-in-part of Ser. No. 899,713, Jun. 17, 1992, abandoned.

[51] Int. Cl.$^5$ ............................................. F02F 3/28
[52] U.S. Cl. ................................. 123/263; 123/193.6; 123/279
[58] Field of Search ............ 123/262, 263, 276, 298, 123/279, 275, 256, 193.6, 259; 92/213, 268, 224

[56] References Cited

U.S. PATENT DOCUMENTS

| | | |
|---|---|---|
| 1,165,086 | 12/1915 | Ford . |
| 1,803,263 | 4/1931 | Lang . |
| 1,825,658 | 10/1931 | Dumanois . |
| 1,865,841 | 7/1932 | Cummins . |
| 1,944,352 | 1/1934 | Lang . |
| 2,076,030 | 4/1937 | Kahllenberger . |
| 2,446,280 | 8/1948 | Hancock . |
| 2,505,999 | 5/1950 | Smith . |
| 2,731,959 | 1/1956 | Kratzer . |
| 2,827,033 | 3/1958 | Bodine, Jr. . |

(List continued on next page.)

FOREIGN PATENT DOCUMENTS

| | | |
|---|---|---|
| 2114901 | 12/1972 | Fed. Rep. of Germany . |
| 16-13767 | 9/1941 | Japan . |
| 61-190153 | 8/1986 | Japan . |
| 62-75022 | 4/1987 | Japan . |
| 787-697 | 12/1980 | U.S.S.R. . |
| 861-681 | 12/1981 | U.S.S.R. . |
| 1081-362 | 3/1984 | U.S.S.R. . |
| 351633 | 7/1931 | United Kingdom . |

OTHER PUBLICATIONS

Shigeru Onishi, et al.-SAE Technical Paper Series #790501 (Feb. 1979)-"Active Thermo-Atmosphere Combustion (ATAC)-A New Combustion Process for Internal Combustion Engines".

Masaaki Noguchi et al.-SAE Technical Paper Series #790840 (Sep. 1979)-"A Study on Gasoline Engine Combustion by Observation of Intermediate Reactive Products During Combustion".

A. A. Pouring, D. Eng.-Oral Presentation at: 1991 SAE Future Transportation Technology Conference (Aug. 6, 1991); vol. 1, First International Conference on Combustion Technologies for a Clean Environment (Sep. 3-6, 1991).

*Primary Examiner*—Tony M. Argenbright
*Assistant Examiner*—M. Macy
*Attorney, Agent, or Firm*—Bacon & Thomas

[57] ABSTRACT

A piston for an internal combustion engine is provided with a reaction chamber for generating radical fuel species during a combustion cycle for use during the next succeeding combustion cycle. The reaction chamber is located adjacent a piston crown recess and is in communication with the main combustion chamber of the engine through discrete orifices that are intended to separately control the supply of fuel and air to the reaction chamber for fuel injected engines and to enhance reaction chamber function in fuel aspirating engines. The discrete fuel and air control orifices are particularly beneficial for use in high swirl, direct injected combustion chambers.

30 Claims, 6 Drawing Sheets

U.S. PATENT DOCUMENTS

| | | |
|---|---|---|
| 2,966,145 | 12/1960 | Froehlich . |
| 3,177,861 | 4/1965 | Quillian, Jr. . |
| 3,283,751 | 11/1966 | Goossak et al. . |
| 3,386,421 | 6/1968 | Hoffmann et al. . |
| 3,897,769 | 8/1975 | Jozlin . |
| 3,923,032 | 12/1975 | Studenroth . |
| 4,002,141 | 1/1977 | Toyoda et al. . |
| 4,023,541 | 5/1977 | Sakamoto et al. . |
| 4,060,059 | 11/1977 | Blaser . |
| 4,104,989 | 8/1978 | Resler, Jr. . |
| 4,105,008 | 8/1978 | Resler, Jr. . |
| 4,105,009 | 8/1978 | Resler, Jr. . |
| 4,128,092 | 12/1978 | Yokata et al. . |
| 4,164,913 | 8/1979 | Komiyama et al. . |
| 4,175,531 | 11/1979 | Tanahashi . |
| 4,175,533 | 11/1979 | Goto et al. . |
| 4,253,430 | 3/1981 | Garter et al. . |
| 4,317,432 | 3/1982 | Noguchi et al. . |
| 4,522,173 | 6/1985 | Agache . |
| 4,535,683 | 8/1985 | Dworak et al. . |
| 4,538,566 | 9/1985 | Tsuruoka . |
| 4,566,413 | 1/1986 | Maly . |
| 4,572,123 | 2/1986 | Evans . |
| 4,592,318 | 6/1986 | Pouring . |
| 4,641,617 | 2/1987 | Aoyama et al. .................... 123/262 |
| 4,686,941 | 8/1987 | Ariga . |
| 4,779,587 | 10/1988 | Schweinzer et al. . |
| 4,788,942 | 12/1988 | Pouring et al. . |
| 4,898,135 | 2/1990 | Failla et al. . |
| 5,029,563 | 7/1991 | Hu ................................... 123/242 |

COMBUSTION CHAMBER FOR INTERNAL COMBUSTION ENGINE AND PROCESS OF COMBUSTION USING FUEL RADICAL SPECIES

This application is a continuation-in-part of U.S. patent application Ser. No. 07/899,713 filed Jun. 17, 1992 (now abandoned).

BACKGROUND OF THE INVENTION

1. Field of the Invention

This invention is in the field of internal combustion engines and in particular pistons for such engines.

2. Discussion of Related Technology

A piston arrangement for achieving improved control over ignition and combustion characteristics of a fuel charge in an internal combustion engine and a process for achieving such controlled ignition and combustion by the generation and management of fuel radical species within the combustion chamber of such an engine is described in U.S. Pat. No. 4,898,135 granted Feb. 6, 1990. In accordance with the patent, a piston for an internal combustion engine, which may be spark or compression ignited, includes a central recess for receiving the majority of each charge during each combustion cycle of the engine and a reaction chamber adjacent the recess for receiving a portion of the fuel and air of each charge. During each combustion cycle, the portion of the charge that is disposed in the reaction chamber undergoes a cool flame oxidation reaction to produce fuel radical species that are discharged in a next succeeding combustion cycle for seeding the next charge admitted to the combustion chamber.

In accordance with the teachings of the aforesaid patent, the generation and management of fuel radical species requires control over the manner in which the fuel and air of each charge is admitted into the reaction chamber and also the manner in which outgasing of the reaction chamber into the combustion zone occurs. In accordance with the prior patent, a continuous slot orifice having critical dimensions is provided to primarily receive fuel and air into the reaction chamber under choked flow conditions during the compression event of each combustion cycle and to enable outgasing of the chamber into the main combustion chamber also under choked flow conditions, whereby a supply of fuel radical species is 15 preserved during each combustion cycle for use in the next combustion cycle due to the time delay in outgasing of the reaction chamber. Optionally, in accordance with the teachings of the prior patent, one or more discrete orifices may also be provided to provide communication between the piston recess and the reaction chamber to achieve better control over the admission of fuel to the reaction chamber.

For a complete discussion of the benefits provided by the piston configuration described in the prior patent, and for a more complete explanation of the manner in which fuel radical species are generated and managed in accordance with a piston having a configuration as described above, reference may be had to the written description and drawings of the prior patent. Essentially, the patent describes the manner in which controlled seeding of a fuel charge before ignition in an internal combustion engine can be utilized to produce dependable and predictable ignition and knock-free combustion of fuels that otherwise would be considered difficult to ignite without ignition improvers or subject to knock during certain engine operating conditions, depending upon the type of engine utilized. In accordance with the prior patent, the generation and management of the supply of radicals in the combustion chamber to achieve the recognized benefits of seeding a fuel charge with such radicals involves using a reaction chamber located adjacent a piston recess with a system that provides controlled communication between the main combustion chamber of the engine and the reaction chamber.

While the use of an appropriately dimensioned continuous slot orifice was considered to be an appropriate means for achieving controlled communication between the main combustion chamber and the reaction chamber in accordance with the prior patent, it has more recently been discovered that the continuous slot orifice can present heat transfer problems in the crown region of the piston and moreover creates certain difficulties in enabling the control of air and fuel admitted to the reaction chamber. It has been observed that it would be highly desirable to more closely control the admission of air and fuel components into the reaction chamber and to enable better heat transfer between the crown portion of the piston and the main body of the piston in the area that previously was dedicated to the continuous slot orifice.

BRIEF SUMMARY OF THE INVENTION

The present invention is an improvement over the system and process described in U.S. Pat. No. 4,898,135, which is incorporated herein by reference. Essentially, the continuous slot orifice is eliminated in favor of at least one discrete orifice intended to primarily control admission of the fuel portion of each charge into the reaction chamber and at least one separate discrete orifice geometrically separated from the first discrete orifice and arranged to control admission of primarily air into the reaction chamber.

Essentially, in accordance with the preferred embodiment of this invention, the axially extending sidewall of the piston recess similar to that described in U.S. Pat. No. 4,898,135 is provided with at least one discrete orifice that is intended to control admission primarily of fuel into the reaction chamber during each combustion cycle, and at least one separate, physically separated discrete orifice is provided to control admission primarily of air into the reaction chamber. By configuring the orifices and adjusting their location to optimize the fluid circulation and heat transfer conditions within the reaction chamber, optimization of the generation of fuel radical species is achieved. Likewise, outgasing of the radical species into the main combustion chamber during a succeeding combustion cycle (i.e., during the intake event) is also achieved in a more controlled manner, since the location of the orifices will contribute to the injection of the radical species into the main combustion zone.

The elimination of the continuous slot orifice improves heat transfer between the crown area of the piston surrounding the reaction chamber and the main body of the piston, which avoids overheating of the piston crown and better control over the sidewall temperature of the reaction chamber. The general configuration of the reaction chamber remains the same as describe in U.S. Pat. No. 4,898,135; that is, the chamber is toroidal or at least has a curvilinear formed sidewall in cross-section and the discrete orifices preferably communicate with the reaction chamber in a tangential direction relative to the curvilinear sidewall so as to induce vortical swirl within the reaction chamber. The swirling mixture of air and fuel promotes desirable cool flame oxidation reaction within the reaction chamber and good heat transfer between the swirling gas mass and the sidewalls of the reaction chamber. The reaction chamber, of course, is disposed closely adjacent the crown area of the piston so that it is subjected to temperatures approaching the temperature of the crown area of the piston.

The use of separate discrete orifices controlling admission of the fuel and air components of the radical generating charge into the reaction chamber also has been discovered to provide a benefit in combustion chambers having high rates of swirl of the charge in the main combustion chamber. Also, the use of the separate orifices provides greater control of combustion within combustion chambers operating at intermediate and high combustion chamber pressures (BMEP). The separate orifices also enables the charge within the reaction chamber to be somewhat stratified between the fuel and air components during each combustion cycle to provide an added degree of control of the degree of homogeneity of the fuel/air mixture within the reaction chamber and therefore the rate of reaction of fuel within the reaction chamber.

The improvement in accordance with the present invention accordingly facilitates a combustion process resulting in less smoke associated with compression ignition engines and other advantages, for example better control over the rate of heat release of any given engine.

DESCRIPTION OF THE DRAWINGS

With reference to the appended drawings.

DETAILED DESCRIPTION OF PREFERRED EMBODIMENTS

Figure 1:
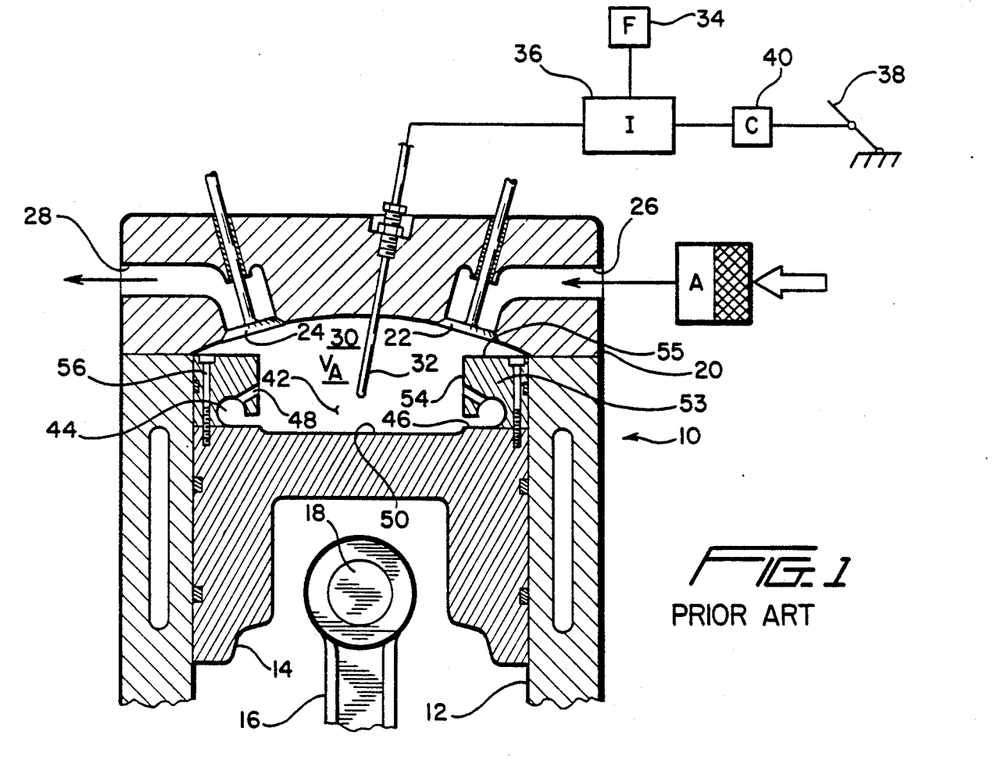
FIG. 1 schematically illustrates a vertical cross-sectional view of the combustion chamber area of a direct injected compression ignition internal combustion engine constructed in accordance with prior art.

FIG. 1 schematically illustrates a side elevation cross-section view of a direct injected, compression ignited (Diesel) type internal combustion engine 10 constructed in accordance with prior art principles specifically in accordance with U.S. Pat. No. 4,898,135. Engine 10 includes a cylinder 12 wherein a reciprocating piston 14 connected to an output crank shaft (not illustrated) via connecting rod 16 attached to piston rod 14 by wrist pin or gudgeon 18 reciprocates between bottom and top dead center positions (BDC-TDC) in accordance with well-known principles so as to provide a variable volume combustion chamber between the top side of the piston and the head 20 of the engine. The piston 14 is shown at top dead center in figure I at which time conventional intake and exhaust valves 22, 24 providing communication between intake and exhaust ports 26, 28 and the combustion chamber, generally designated at 30, are closed. Valves 22, 24 typically are actuated by any conventional system commonly used for such purposes in internal combustion engine technology so that synchronized opening and closing of the valves 22, 24 enables at least air to be drawn into the combustion chamber through air cleaner A and intake port 26 and compressed during the intake and compression portion of the combustion cycle. Fuel is admitted by direct, timed injection through fuel injector 32. Compression, combustion and expansion of a charge in the combustion chamber then occur and combustion products are discharged through exhaust port 28 during the exhaust portion of a combustion cycle of the engine. As mentioned above, fuel is directly injected into the combustion chamber through a fuel injection nozzle 32 which receives fuel from a supply 34 via an injector pump system 36 under the control of an engine speed control (i.e., accelerator pedal 38) through a control module 40, so that fuel is injected into the combustion chamber in a spray pattern as the piston 14 approaches top dead center during the compression portion of the combustion cycle. Any appropriate fuel injector system could be used in accordance with this combustion system and it is assumed that a person skilled in the art of fuel injection technologies for internal combustion engines will be familiar with suitable systems and components that can provide timed injection of fuel into the combustion chamber of the engine as shown in synchronism with the combustion cycle under the control of a "throttle" or accelerator pedal 38, whereby an appropriate supply of fuel/air charge is injected as a spray into combustion chamber 30 near the end of the compression portion of the combustion cycle and usually continuing over the piston top dead center position and during part of the combustion chamber expansion event.

In the compression ignition system illustrated in FIG. 1, the combustion of the charge is initiated solely as a result of the charge being subjected to elevated pressure and temperature conditions, whereby spontaneous ignition of the charge occurs at a desired moment. In typical fashion, a glow plug (not illustrated) is utilized to initiate combustion during startup of the engine.

For a further discussion of the system illustrated in FIG. 1, reference may be had to U.S. Pat. No. 4,898,135.

In accordance with the prior art system illustrated in FIG. 1, during each combustion cycle a portion of the fuel and air of each charge is admitted into a reaction chamber 44 that is generally toroidal or curvilinear in cross-section via a 15 continuous slot orifice 46 and optionally through discrete orifices 48. Notably, both the continuous slot 46 and the orifices 48 are intended to directly receive fuel and neither orifice is arranged to receive primarily air alone from the main combustion chamber. The fuel and air in the reaction chamber 44 is partially reacted during each combustion cycle to produce radical species of the fuel and oxygen ("fuel radical species") that are utilized in the next successive combustion cycle for seeding the next incoming charge to thereby condition the next charge to achieve desired ignition and heat release characteristics during the next combustion cycle. Reference may be had to the above-mentioned U.S. Pat. No. 4,898,135 for a more complete discussion of the generation and management of radical fuel species in accordance with the combustion chamber configuration illustrated in FIG. 1.

Continuing the discussion of the prior art embodiment of FIG. 1, piston 14 is provided with a recess 42 in its crown area that is intended to represent a substantial portion of the volume $V_A$ of combustion chamber 30. [Volume $V_A$ is defined as the total clearance volume ($V_C$) in the combustion chamber 30 when piston 14 is at TDC minus the volume $V_B$ of reaction chamber 44 including the orifice areas]. Thus, in accordance with this engine configuration, at the point of ignition, upon completion of the compression event during each combustion cycle, recess 42 contains most of the fuel portion of each charge in the combustion chamber volume $V_A$. As described more completely in U.S. Pat. No. 4,898,135, reaction chamber 44 may comprise a single annular reaction chamber, or may comprise a plurality of reaction chambers spaced about the periphery of the recess 42. The recess 42 is defined by a transversely extending bottom wall 50 and axially extending sidewalls 54. In accordance with the embodiment of FIG. 1, the sidewalls 54 are discontinuous to the extent that the continuous slot orifice 46 interrupts the intersection between the sidewalls 54 and the bottom wall 50.

For simplicity of manufacture, the embodiment illustrated in FIG. 1 includes an annular crown block 53 in which the reaction chamber 44 is formed and which includes the sidewalls 54 of the recess 42 and the piston crown area 55. The block 53 is secured to the upper side of the piston 14 by fasteners 56, whereby the reaction chamber 44 can be formed in the block 53 and then the block ..... 53 assembled to the lower portion 14 of the piston. Of course, any suitable manufacturing method known to those skilled in the art could be used to make the piston 14 and its reaction chamber 44. While technical hurdles may need to be overcome to create a toroidal shaped reaction chamber 44, in a more practical application the chamber 44 may be shaped or configured so that it has a more simple curvilinear sidewall in cross section enabling convenient manufacture or shaping of the chamber before the block 53 is assembled to the top of the piston 14.

In accordance with the prior art embodiment illustrated in FIG. 1, a portion of the liquid fuel from injector 32 was admitted directly through continuous slot 46 into reaction chamber 44 and optionally through the discrete orifice 48. While this embodiment achieved the objectives of generating radical fuel species for use in subsequent combustion events, under some circumstances it was observed that heat transfer between the block 53 and the piston 14 was poor due to the presence of the continuous slot 46 and the continuous slot 46 with or without orifice(s) 48 presented problems in controlling admission of air and fuel content separately in the reaction chamber 44.

Figure 2:
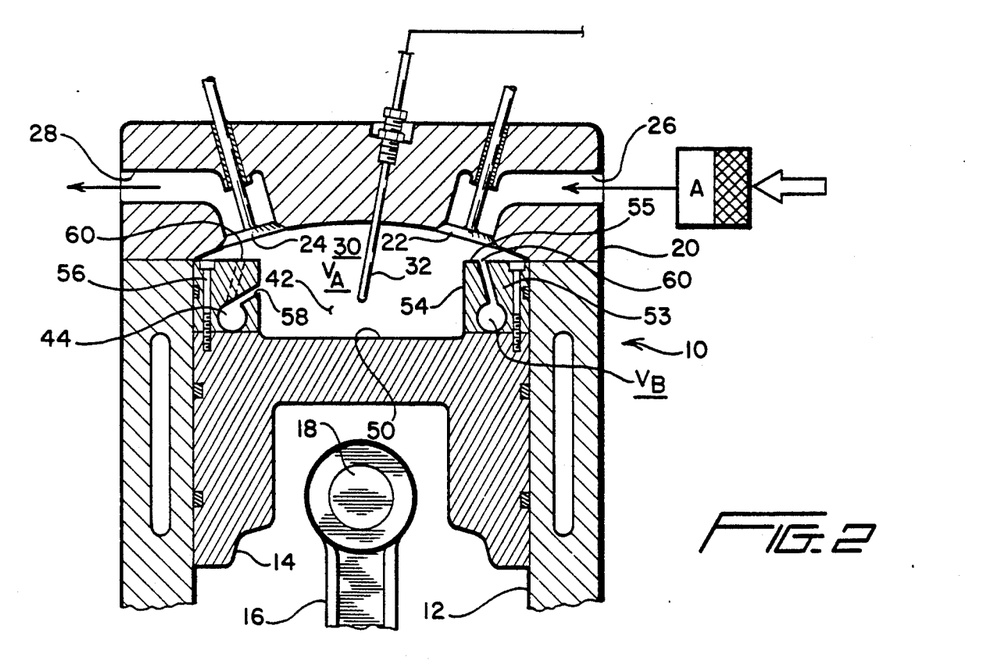
FIG. 2 is a view corresponding to FIG. 1 showing the combustion chamber modified in accordance with the present invention.
Figure 3:
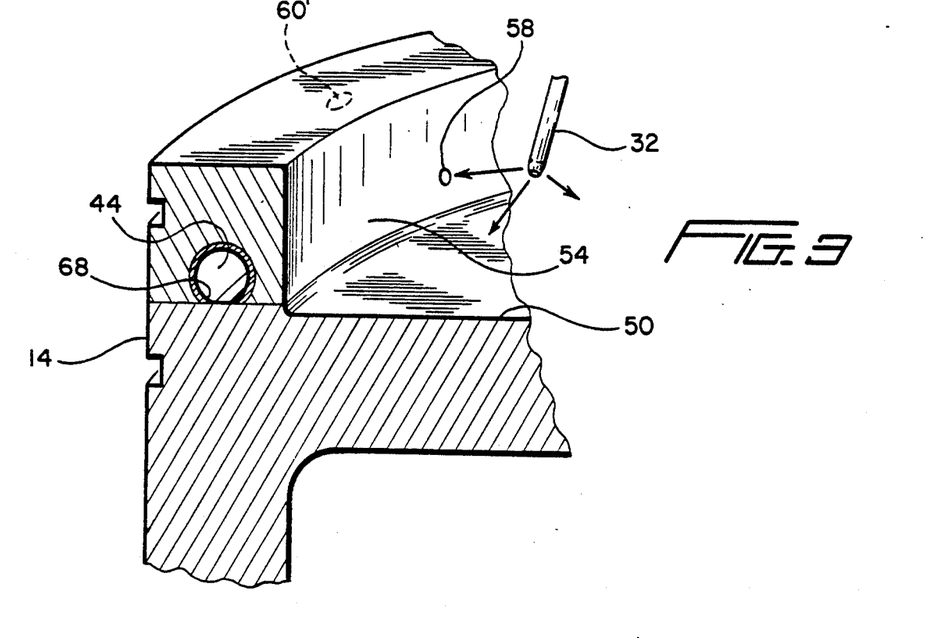
FIG. 3 shows an enlarged isometric section view of a piston crown area taken along line III—III in FIG. 4.
Figure 4:
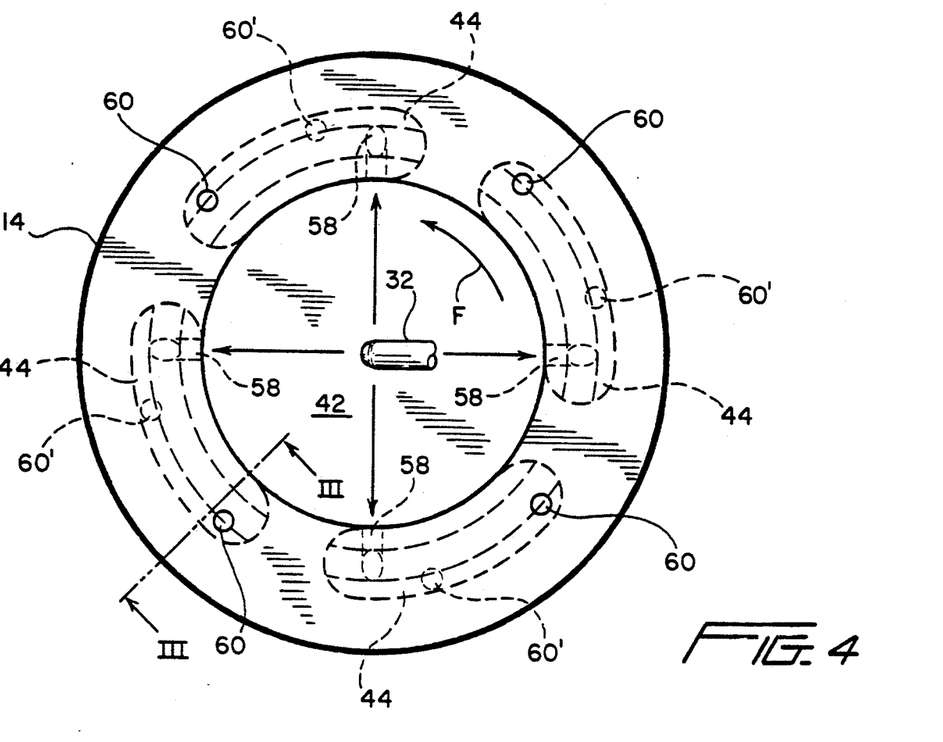
FIG. 4 schematically illustrates a plan view of a piston crown area incorporating a preferred embodiment of reaction chambers constructed in accordance with the invention.

As a result of further experimentation, preferred embodiments of the present invention are believed to overcome certain shortcomings in the prior art system illustrated in FIG. 1. Accordingly, one preferred embodiment of the invention is illustrated in FIGS. 2 through 4, where like reference numerals are utilized to identify elements corresponding to elements illustrated in FIG. 1. In accordance with the invention, the continuous slot orifice 46 is eliminated in its entirety and instead only discrete orifices are utilized to provide communication between recess main combustion chamber 30 and the interior of reaction chamber 44. The term "discrete orifice" is intended to distinguish an opening or aperture having a closed and generally symmetric or uniform geometry (e.g., circular, square, etc.) as opposed to a continuous or elongated open slot or gap.

In accordance with this embodiment of the invention, discrete orifices 58, 60 are provided to separately control primarily the admission of fuel and air, respectively, into reaction chamber 44. Discrete orifices 58 in this embodiment are provided in the axially extending sidewall 54 of recess 42 in piston 14. Orifice 58 is located so as be directly impinged by the spray pattern ejected from fuel injector 32 so as to ensure the direct supply of fuel into reaction chamber 44 each combustion cycle. In accordance with this embodiment, a separate discrete orifice 60 intersecting the crown region 55 of piston 14 (the upper surface of block 53) is provided to control primarily the admission of air into reaction chamber 44. It will be observed that the orifices 58 and 60 are spatially separated from each other so that the spray pattern of fuel from injector 32 does not impinge the area where the air orifice 60 is located. Thus, it will be seen that orifice 58 primarily controls 15 admission of fuel into chamber 44, while orifice 60 primarily controls admission of air into chamber Preferably, orifices 58 and 60 are channeled from the outer walls of block 53 inwardly towards chamber 44 so as to intersect the curvilinear sidewall of chamber 44 tangentially or at least in a direction that will induce vortical swirl in chamber 44. The direction of vortical swirl will be such that fluid flow does not tend to move back out through orifices 58, 60, but rather tends to stay confined within the reaction chamber 44. As seen in FIG. 2, orifices 58 and 60 are both shown as preferably intersecting the curvilinear sidewall of reaction chamber 44 tangentially. It should be noted, however, that it may be desirable to intersect the sidewall of reaction chamber 44 in a direction other than tangentially to achieve desired flow patterns within the reaction chamber 44.

Figures 5, 6, 7, 8A, 8B, 8C, 8D:
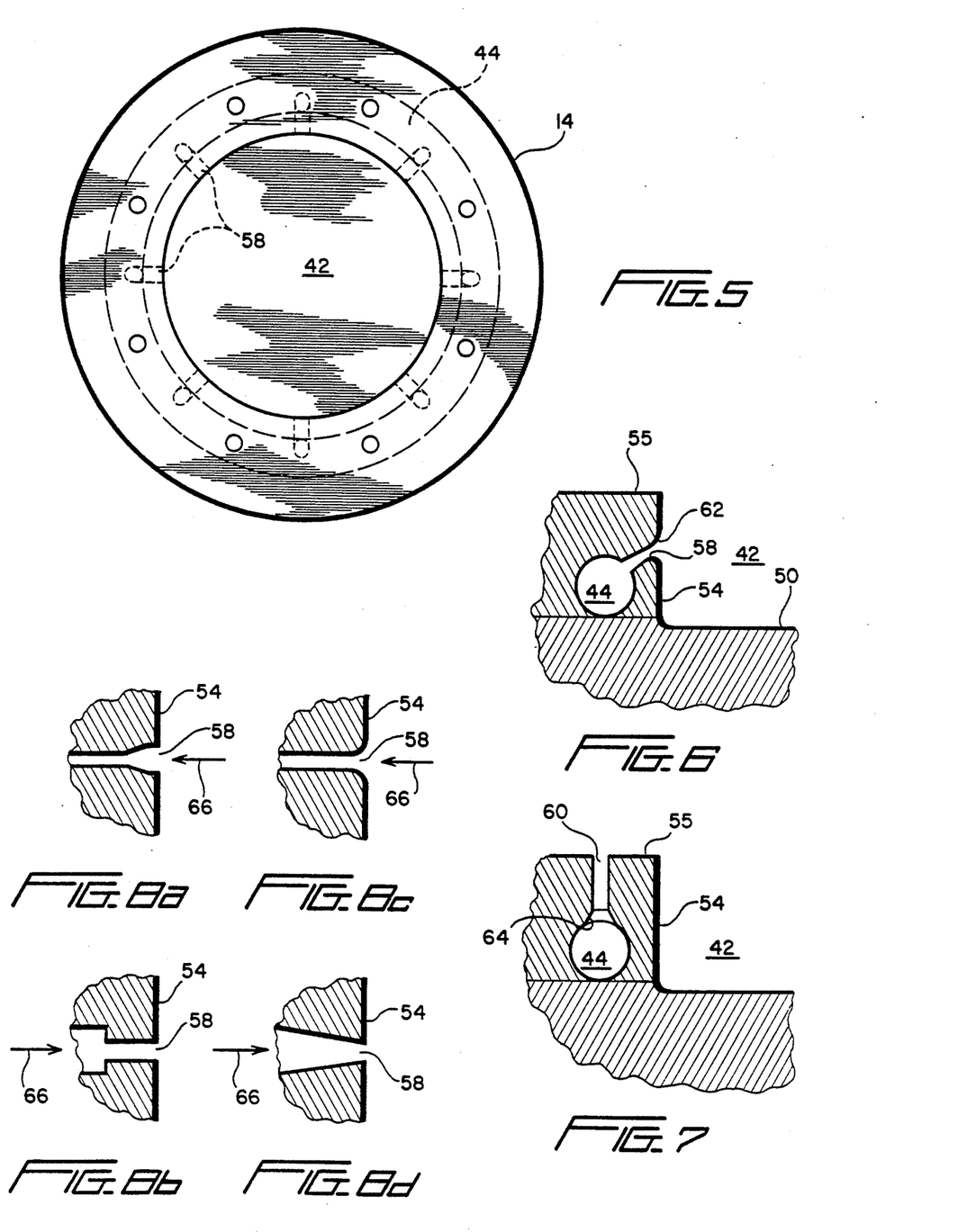
FIG. 5 shows an alternate embodiment of the reaction chambers constructed in accordance with the invention.
FIG. 6 is an enlarged detail showing an alternate embodiment of an orifice area between the recess area of the piston and the reaction chamber associated therewith.
FIG. 7 shows a detail of another embodiment of an orifice area in communication with the reaction chamber and the piston crown area.
FIGS. 8a–8d illustrate various embodiments of orifice openings associated with the reaction chamber of the present invention.

Reaction chambers 44 may be provided in the piston crown area as separate, discrete chambers as illustrated in FIG. 4 or may take the form of a continuous annular chamber as shown in FIG. 5. The choice of single or multiple chambers will depend upon piston and combustion chamber configuration or manufacturing considerations.

In the embodiment of FIG. 4, arrow F indicates the direction of swirling motion of a charge admitted into combustion chamber 30 by any appropriate system, for example inlet valve or port configuration, When swirl of the charge is :: induced in combustion chamber 30, discrete orifice 58 intended to control admission of primarily fuel is disposed towards the end of its respective reaction chamber 44 in a direction that is upstream of the direction of swirl F of the charge in the combustion chamber and in the recess 42. The discrete orifice 60, on the other hand, is usually located towards the other end of the reaction chamber 44, or at least separated from the fuel control orifice 58 so that it is not impinged by the fuel stream ejected by the fuel injector 32. In this embodiment, the air control orifice 60 is provided in the crown region of the piston towards the opposed end of the reaction chamber 44 at which fuel control orifice 58 is located. It has been observed that the location of the fuel control orifice 58 towards the upstream end of chamber 44 relative to the swirl direction F in the piston recess is important to achieve control over the admission of fuel into the reaction chamber 44. It is highly desirable to locate orifice 58 so that the fuel impinges on the orifice during most operating conditions of the engine regardless of the degree of swirl in the combustion chamber. Some experimentation is required to precisely locate the orifice 58 so that it remains within the spray pattern of injector 32 at least during critical regimes of engine operation. While the location of the air control orifice 60 must be maintained separate from the fuel orifice 58, the location of the air control orifice 60 may be varied for different engines, and may even be located on the axial sidewall 54 of the piston recess.

Optionally, an additional discrete air controlling orifice 60' may be provided in the piston crown area for providing communication with a respective reaction chamber 44. The optional additional discrete orifice 60', like the orifice 60, may be located anywhere along the piston crown area or the sidewall 54 in accordance with experimental or parametric studies that will indicate achievement of optimum radical generation and management conditions in reaction chamber 44 for any given engine. The combination of orifices 60 and 60', therefore, is intended to provide optimum air content and flow conditions within reaction chamber 44 for each combustion cycle. In any case, flow through orifices 58, 60 and 60' will always reach a choked condition at some point during each compression and expansion event during each combustion cycle to preserve radicals for seeding in a succeeding combustion cycle.

In accordance with the invention, it is highly desirable to finely adjust fluidic flow conditions into and out of reaction chamber 44 by suitably shaping the orifices 44 at their intersection with either the piston crown area, sidewall 54 of recess 42 or the sidewall of the reaction chamber 44. Accordingly, as illustrated in FIGS. 6–8d, orifices 58 and 60 are illustrated with transition regions at their terminal areas that will favor flow into or out of reaction chamber 44.

As shown in FIG. 6, orifice 58 is provided with a generally conical or tapered inlet zone 62 that would favor fluid flow from recess area 42 towards reaction chamber 44. In accordance with the embodiment illustrated in FIG. 7, flow of radical species from reaction chamber 44 would be favored in a direction outwardly from orifice 60 in the piston crown area due to the conical transition zone 64 at the terminus of orifice 60 where it intersects the sidewalls of reaction chamber 44.

Likewise, FIGS. 8a–8d show various other configurations favoring fluid flow in the direction of the arrows 66. While the embodiments illustrated in FIGS. 8a–8d show orifices 58, orifices 60 could be configured in the same manner to achieve the same result in terms of favoring a specific direction of fluid flow through the orifice.

Figure 9:
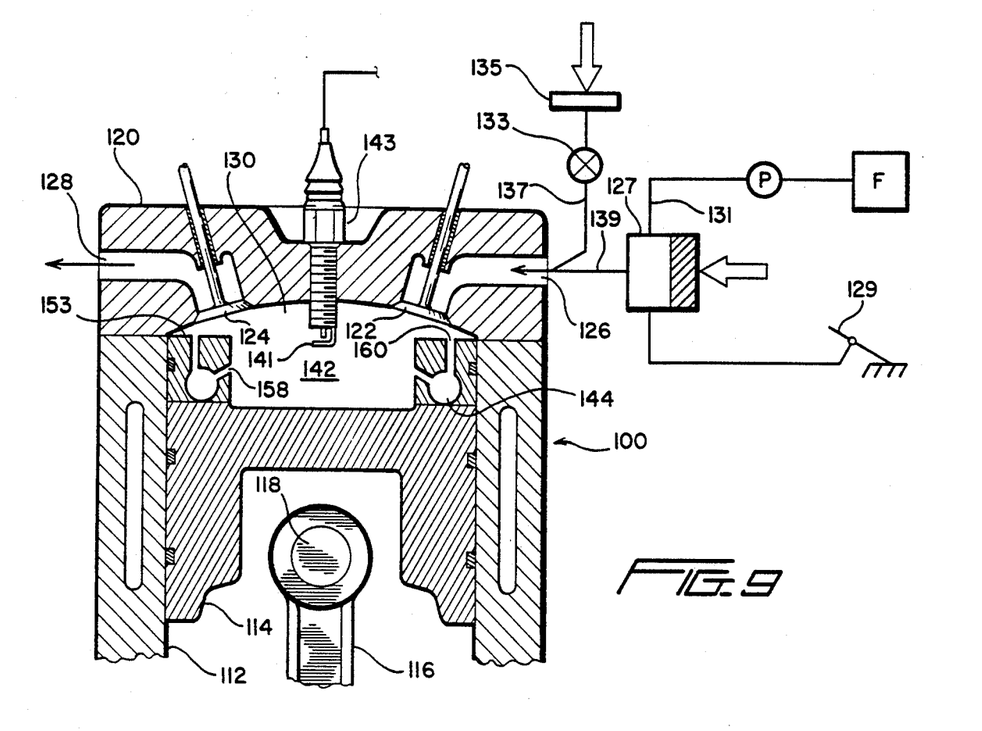
FIG. 9 illustrates an embodiment of the invention in a spark ignited engine.

FIG. 9 illustrates an embodiment of the invention in which the fuel portion of the charge is aspirated with air and wherein the charge is ignited by a spark igniter. The engine 100 illustrated in FIG. 9 is generally similar to the engine configurations illustrated in FIGS. 1 and 2, wherein piston 114 in cylinder 112 is connected to an output crankshaft via connecting rod 116 to which it is connected at wrist pin 118. A piston crown 153 is provided with reaction chamber 144 and the combustion chamber 130 is disposed between the upper end of the piston 114 and the head 120 of the engine. Inlet and exhaust openings 126, 128 are closed by inlet and exhaust valves 122, 124 and a spark igniter 141, 143 connected to a suitable source of electrical energy is utilized to ignite a charge in the combustion chamber 130. Reaction chamber or chambers 144 communicate with the recess 142, with discrete orifice 158 communicating through the sidewall of the recess 142 and the discrete orifices 160 communicating with the combustion chamber 130 via the piston crown area.

The charge is prepared upstream of the inlet opening 126 under the control of an accelerator or other engine speed control 129. Fuel is supplied through the fuel supply F via a pump P and fuel line 131 to a carburetor 127 connected to inlet manifold 139, where the fuel and air are mixed to prepare a homogenous charge supplied to inlet 126. Fuel may be injected or aspirated upstream of inlet 126 or could be directly injected into the inlet port area 126 in accordance with known principles.

If desired, each charge may be axially stratified within the combustion chamber 130, for example by using a secondary air valve 133 which admits air through intake cleaner 135 and duct 137 into intake manifold 139 adjacent the intake valve 122. Such a secondary air valve 133 could be provided in the form of a simple flapper valve that admits air into the intake opening 126 immediately 15 upstream of the intake valve 122 towards the end of each intake event so that a very lean mixture is provided upstream of the intake valve 122 when the valve closes. Upon opening of the valve during the next intake event, a very lean mixture is aspirated into the combustion chamber 130 before the fuel enriched portion of the charge reaches the chamber via the carburetor 127. In this manner, axial stratification of the charge within combustion chamber 130 can be achieved, whereby at the conclusion of the compression event, a relatively lean charge is provided closer to the bottom of the combustion chamber 130 within recess 142, while a relatively rich portion of the charge lies adjacent the ignition point 141 of spark igniter 143.

Of course, during normal intake and compression events, the orifice 160 will receive primarily air at the beginning of the compression stroke, with fuel reaching the orifice late during the intake event if axial stratification is utilized. Orifice 148 could be located to receive a richer mixture or primarily air only. In the case of a homogenous charge in which no axial stratification occurs, both orifices 158 and 160 will receive a portion of the air and fuel of each charge, although the location of the respective orifices 158, 160 can be arranged such that, if desired, the fuel portion of each charge could be focused towards, for example, orifices 158 as opposed to orifices 160. As with the embodiment of the invention shown in FIG. 2, the dimensions of the orifices 158 and 160 are selected so that choked flow conditions occur through the orifice at some point during compression, expansion and exhaust events of the combustion cycle of the engine.

It is to be noted that in all of the embodiments, reaction chamber 44, 144 has a volume $V_B$, which is intended to include the volumes of the discrete orifices 58, 158 and 60, 160. It has been observed that the relationship between $V_A$ (the entire combustion chamber clearance volume) and $V_B$ is important in specific engine configurations. It is believed that the invention is best embodied in a typical automotive or truck engine when the relationship between $V_A$ and $V_B$ satisfies the formula:

$$\frac{V_B}{V_A} = 0.01 \text{ to } 0.20$$

In an engine wherein the fuel portion of the charge is aspirated during the intake portion of the combustion cycle, then during compression air and fuel will be admitted into chamber 44, 144 through both orifices 58, 158 and 60, 160 particularly if the charge is homogeneous. The size and orientation of the orifices, of course, would be adjusted to achieve the appropriate desired mixture of fuel and air in reaction chamber 44, 144. Also, various stratification schemes could be utilized to vary the richness of the aspirated charge axially in the combustion chamber during the compression portion of the combustion cycle, so that orifices 58, 158 and 60, 160 could be utilized to achieve the desired proportioning of fuel and air in the reaction chamber 44, 144 in a manner similar to a direct injected combustion chamber. That is, orifices 58,. 158 would be oriented to control the admission of the majority of fuel and orifices 60, 160 to control the admission of primarily air into chamber 44, 144.

In all embodiments of the invention, orifices 58, 158 and 60, 160 are configured so that an advancing combustion flame front in combustion chamber 30, 130 is effectively quenched before reaching reaction chamber 44, 144.

For a discussion of the choked flow condition achieved during each combustion cycle within orifices 58, 158 and 60, 160, reference may be had to U.S. Pat. No. 4,898,135. However, choked flow conditions across the orifices occur in accordance with classical compressible fluid mechanics when the pressure ratio across the orifices is equal to or less than the critical ratio of about 0.53. Thus, during the compression portion of a combustion cycle, gases at increasingly higher pressure in combustion chamber 30, 130 attempting to reach reaction chamber 44, 144 through orifices 58, 158 and 60, 160 would flow progressively faster through the orifices until, at a critical pressure ratio of about 0.53, a choked condition is reached, at which time the pressure ratio increases across the orifices and the corresponding rate of flow therethrough is limited according to the laws of classical fluid mechanics. This condition would last until the pressure in the chamber 44, 144 increased to the point that the pressure ratio across the orifices drops below the critical choked condition, whereupon the pressures between the combustion chamber 30, 130 and reaction chamber 44, 144 would be equalized by flow through the orifices. The choked flow condition during part of the compression event, accordingly, is intended to occur at substantially all normal operating speeds of the engine so that the pressure fluctuations in the reaction chamber lag the pressure fluctuations in the combustion chamber. This choked flow condition also occurs during at least part of the expansion (power stroke or combustion event) and exhaust events, further continuing the pressure lag condition mentioned above between the reaction chamber and combustion chamber due to the pressure differential between the chambers.

In accordance with principles described in U.S. Pat. No. 4,898,135, the relationship between the outflow of radicals from the reaction chamber, the rate of generation of radicals within the chamber, the rate of radical inflow into the chamber from the combustion chamber and the rate of radicals retained in the reaction chamber are in accordance with the following formula:

$$R_{OUT} = R_{GEN.} + R_{IN} - R_{RET.} \geqq R_{CRIT.}$$

where:

$R_{OUT}$ = radicals discharged from the reaction chamber into the piston recess;

$R_{GEN.}$ = radicals generated during each combustion cycle in the reaction chamber;

$R_{IN}$ = seeded radicals from the combustion chamber returned to the reaction chamber during compression of the seeded charge;

$R_{RET.}$ = radicals retained in the reaction chamber each combustion cycle;

$R_{CRIT.}$ = the minimum population of radical species in the reaction chamber required to consistently seed a charge in the combustion chamber during each combustion cycle so as to obtain a preselected ignition and combustion characteristic of the charge for a given engine.

It is to be kept in mind that an overall objective of the invention for a compression ignition engine is to seed the incoming charge so that an effective concentration or population of radical species will be present in the combustion chamber 30, 130, in particular in the recess area 42, 142, of the piston, so that initiation of ignition of the fuel charge, including low cetane fuels at normal compression ratios, will occur in a predictable, dependable manner, It is assumed, of course, that an appropriate physical environment, including pressure and temperature conditions, for initiating ignition will be present in the combustion chamber by selection of an appropriate compression ratio, materials of construction and cooling system. However, the benefits of the invention are that dependable, consistent compression-ignition can be achieved with various fuels, including those having a low cetane value, by radical seeding of the charge.

The above formula indicates that the production of radicals and the seeding of the incoming charge for each combustion cycle must be equal to or exceed that rate sufficient to initiate combustion in the main combustion chamber 30, 130 consistently and reliably, and/or to enable knock free combustion of gasoline fuels in a spark ignited engine. Of course, the absolute amount of radical production in chamber 44, 144 will vary for each engine depending on the fuel used, compression ratio, operating conditions and other variables associated with operation of each engine. However, it can always be determined experimentally utilizing the principles described herein what the critical rate ($R_{CRIT}$) of production of radicals in the chamber 44, 144 must be to achieve adequate conditioning (i.e., seeding) of the charge in the combustion chamber to obtain such consistent and reliable spontaneous ignition and smoke free combustion in compression ignition engines or knock free combustion in spark ignited engines.

From the formula, it will be seen that the quantity of radicals generated within chamber 44, 144 plus the quantity of radicals readmitted into the chamber with the current charge undergoing compression, less the quantity of radicals retained within chamber 44, 144 during the current combustion cycle, must equal or exceed that critical quantity of radicals that will be available in chamber 44, 144 for eventual discharge through discrete orifices 58, 158, 60, 160. The discharge occurs substantially under choked flow conditions starting during the expansion portion of the combustion cycle when the pressure in the combustion chamber 30, 130 drops below the pressure in the reaction chamber 44, 144 with the critical pressure ratio existing across the discrete orifices 58, 158, 60, 160. The discharge continues through the exhaust event under choked flow conditions until the beginning of the intake portion of the cycle so that a time lag exists between the pressure fluctuations within the combustion chamber 30, 130 and the reaction chamber 44, 144. This ensures that the discharge of radicals from chamber 44, 144 will continue past the expansion and exhaust portions of the combustion cycle and continue into the intake portion of the combustion cycle involving the next succeeding charge. This ensures a supply of sufficient quantity of radicals into combustion chamber 30, 130 to obtain the desired ignition and combustion characteristics of the charge undergoing compression in any given engine. Where the charge undergoing compression may not receive the fuel portion of the charge until late during the compression portion of the cycle, for example when the fuel is directly injected into the combustion chamber, radical seeding of the air portion of charge early during the intake event will achieve the desired results, since the desired radical population will be present in the combustion zone at the moment of injection of the fuel.

It is important to note that radical species of fuel produced as a result of pre-flame or cool flame reaction (i.e., "pre-combustion" radicals) are important for seeding an incoming charge to obtain the desired reliable ignition and combustion characteristics sought by the invention. The presence of various products of oxidation reaction of fuels following combustion and left over following the exhaust portion of the combustion cycle are of lesser importance in conditioning a fuel charge for a dependable and controllable ignition point.

Therefore, it is important in accordance with the invention that pre-combustion radicals be generated, preserved and controllably supplied to the combustion chamber in accordance with the aforesaid formula. Sufficient radicals must be produced and made available to the combustion zone each combustion cycle to ensure the achievement of the desired ignition and/or combustion characteristics of the charge for any engine. This is achieved in accordance with the invention by providing the reaction chamber 44, 144 adjacent a piston recess 42, 142 and communicating with the piston recess in such a manner that the choked flow condition occurs across the communicating orifices 58, 158 and 60, 160 to both retain a quantity of pre-combustion fuel radicals beyond an exhaust event and to supply a critical quantity of the preserved radicals to the combustion zone in a succeeding combustion cycle under controlled conditions.

In any practical embodiment of the invention, it has been discovered that certain design parameters are important for establishing a relationship between the reaction chamber volume, the combustion chamber volume and the total orifice area of the discrete orifices. More specifically, it is presently believed that the invention is best achieved when the following relationships occur.

$$I = \frac{X}{Y} = 16 \text{ to } 26$$

$$\text{where: } X = \frac{V_c}{A_p}$$

$$\text{and: } Y = \frac{V_{TDC}}{V_{CT}}$$

and where:

I = design index
$V_c$ = individual reaction chamber volume
$A_P$ = total orifice area of all discrete orifices communicating with individual reaction chamber
$V_{TDC}$ = total top dead center combustion chamber volume
$V_{CT}$ = total reaction chamber volume(s)

The above value for "I" provides a design calculation for any engine to obtain an initial total orifice area for the discrete orifices 58, 158, 60, 160 of any given piston and reaction chamber in a given engine. Since it may be assumed initially that all the orifices for any given chamber are equal in size, the total orifice area is simply divided by the number of orifices to be provided with any reaction chamber. The value of the design index "I" has been determined experimentally by measuring the performance of various engine configurations using a variety of combinations of combustion chambers, orifices and reaction chambers to determine which combination produces the best engine performance. Through much experimentation, it has been determined that the design index, a non-dimensional value, should lie between approximately 16 and 26 for any given engine. Using this value of "I" as a starting point, the volumes of the reaction chamber or chambers can be initially designed for any given engine and the total orifice area of all discrete orifices can be determined. The total orifice area is then divided by the desired number of discrete orifices to be utilized primarily for the control of admission of fuel and for the control of admission of air. Depending upon the size and orientation of the reaction chambers, initially one might begin by dividing the total orifice area in two and providing one fuel control orifice and one air control orifice. However, more typically, several fuel control orifices may be provided and several air control orifices may be provided at separate locations along the reaction chamber. The location of the orifices will be fine tuned to ensure maximum Run Quality Index" (RQI) for any given engine. Moreover, the size and location of the 15 discrete orifices can be tuned to custom tailor the rate of heat release curve for any given engine in the event that the engine designer wishes to obtain specific engine characteristics, for example, specific power, torque or emissions characteristics.

For a discussion of RQI, reference is made to U.S. Pat. No. 4,592,318 granted Jun. 3, 1986. As described in that patent, RQI is a non-dimensional value representing the relationship between indicated horsepower (IHP) of an engine, its indicated specific fuel consumption (ISFC), unburned hydrocarbons emitted through the engine exhaust stream (UHC) and carbon monoxide contained in the exhaust stream (CO). In accordance with the formula (where K is a constant):

$$RQI = \frac{(IHP)K}{(ISFC)(UHC)(CO)}$$

At maximum RQI, an engine is considered to be operating at its maximum practical efficiency at any speed and load which, as will be appreciated, is not necessarily the same as the maximum theoretical efficiency of the engine under the same conditions. The maximum RQI curve is intended to establish a target for establishing a charge air-to-fuel ratio, and suitable spark timing during actual engine operation.

It will be observed from FIG. 4 that orifices 58 and 60 are respectively located at opposite ends of reaction chamber 44. In this preferred embodiment, it may be desirable to create conditions of non-symmetry (i.e., chaos) within the reaction chamber 44 to provide better control over the generation of fuel radical species and over the discharge of the radical species into the main combustion chamber during a succeeding combustion cycle. However, in any given engine the precise locations of the orifices 58, 158 and 60, 160 will be dictated by the particular engine combustion chamber, engine operating conditions, the type of combustion cycle that is occurring within the engine and perhaps other factors. In a fuel injected engine, for example, particularly where compression ignition is utilized in the combustion cycle, admission of fuel into chamber 44 will be controlled primarily through orifice 58 and air will be controlled primarily through orifice 60. This spaced location of the orifices 58, 60 provides a degree of control over the fuel and air mixture and the cool flame reactions occurring within the reaction chamber. Also, the use of spaced orifices enables better control over swirl motion within chamber 44 to better control heat transfer between the mixture in chamber 44 and the piston crown material.

It is believed that the reaction chamber 44, 144 can be regarded as a chemical clock (pendulum) or chemical oscillator due to the short residence time of the reactants in the cavity. Reaction time of this chemical oscillator can be varied by both heterogeneous (surface activated) catalysis and autocatalysis (catalysis of a chemical reaction by one of the products of the reaction). Accordingly, in addition to the internal flow control (from uniform to chaotic) within the chamber achieved by using separate fuel admission control and air admission control orifices spaced apart from each other and using tangential vortical flow in the chamber, further control over the reaction rate within the chamber can also be effected through surface catalysis using appropriate catalytic materials or coatings 68 within chamber 44 and also by relying on autocatalysis within the chamber.

Combustion chambers and reaction chambers constructed in accordance with the invention provide enhanced control over the rate of heat release in engines, particularly Diesel (compression ignition, direct injected) engines. In effect, one can optimize engine performance by rate shaping of the heat release curve to provide the best compromise between emissions (including smoke) and fuel consumption for a given power output. The present invention provides a self-contained control system for adjusting the rate of heat release without the need to resort to expensive electronic fuel injection control systems.

It should also be noted that the crown area of piston 14 associated with reaction chamber 44 may be constructed of various materials to enhance or control heat transfer between the combustion chamber 30 and the reaction chamber 44. Thus, selections can be made from various materials, such as aluminum, niresist (high nickel, 35% cast iron), composite materials, ceramics, carbides, zeolites and the like. The choice of materials, of course, will depend upon the temperature and pressure conditions within the combustion chamber 30, engine load, engine speeds, engine cooling and other typical engine operating conditions and configurations.

Figures 10, 11:
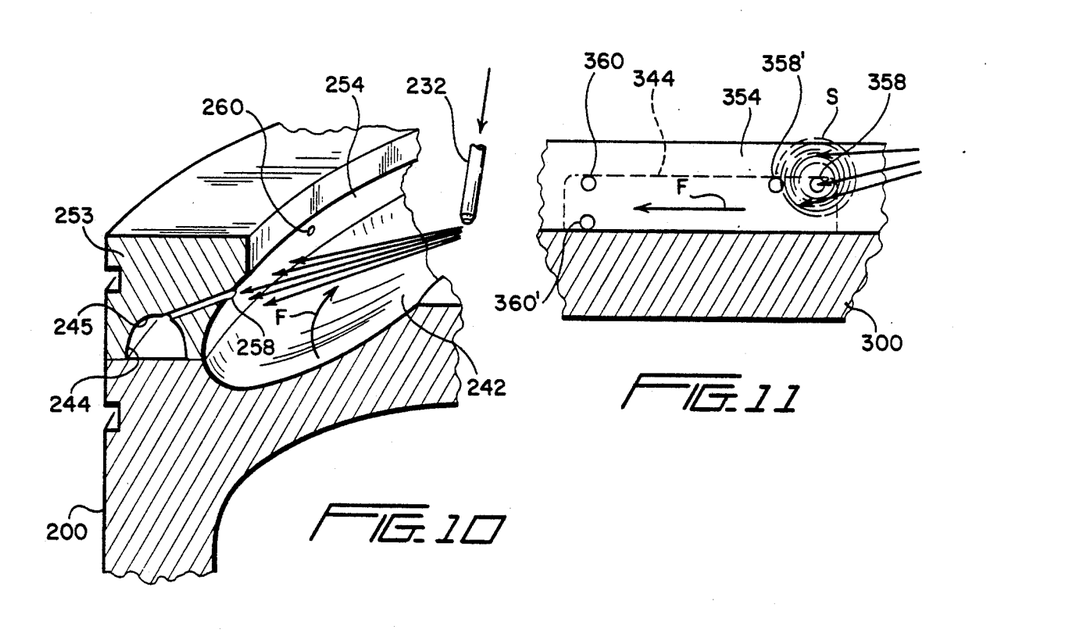
FIG. 10 illustrates an alternate preferred embodiment of the invention showing a different form of piston recess and reaction chamber configuration.
FIG. 11 is a schematic illustration of an alternate preferred embodiment showing a piston crown area with fuel and air discrete orifices and a fuel impingement zone.

FIG. 10 illustrates an alternate preferred embodiment of the invention wherein a piston 200 is provided with a recess 242 that is sloped in a radially outward direction so as to provide a pocket area for receiving fuel ejected from fuel injector 232. In accordance with this embodiment, reaction chamber 244 having a curvilinear upper wall 245 is provided in the crown region of piston 200 by forming the chamber in a block 253 attached to the upper portion of piston 200. Of course, chamber 244 could be integrally formed in piston 200 wherein both the piston 200 and the block 253 would be integrated as a single element, provided that a suitable forming technique is utilized to create the reaction chamber 244. Any suitable manufacturing method known to those skilled in the art could be utilized to produce the reaction chamber 244, including its curvilinear sidewall 245. 15 In this embodiment, a single discrete orifice 258 is utilized to primarily control the admission of fuel into the reaction chamber 244. To achieve this result, discrete orifice 258 is located in the center of the spray pattern of fuel emitted from injector 232, or may be slightly eccentric of the center to take into the account the swirl moving in the direction indicated by arrow F. A separate, geometrically separated discrete orifice 260 is utilized in the sidewall 254 of the recess 242 to primarily control admission of air into the reaction chamber 244. In this embodiment, the orifice 260 for controlling air admission into the reaction chamber is circumferentially separated from the orifice 258 and may be located at a higher or lower point relative to the reaction chamber 244 to achieve desired circulation of fluid in reaction chamber 244.

In FIG. 11, there is illustrated another preferred embodiment of an array of discrete orifices utilized for controlling admission of air and fuel into reaction chamber 344. It will be observed that the fuel impingement area A is illustrated by a series of concentric circles that in practice are observed on the sidewall area of the recess of a piston 300. The discrete orifice 358 is located in the center zone of the impingement area S so that it receives fuel sprayed by a fuel injector (not illustrated) into the combustion chamber above piston 300. In FIG. 11, the view is taken from the central region of a piston 300 in an outward radial direction so that one is viewing the inside of the axial wall 354 defining a central recess in piston 300. The direction of swirl motion within the piston recess is indicated by arrow F. In order to ensure that the reaction chamber 344 will always receive fuel even at high swirl rates which occurs at higher engine speeds, a secondary fuel control discrete orifice 358' is provided toward the outer region of the fuel spray pattern S on the downstream side of the fuel spray pattern relative to the direction of swirl F so that swirl motion tends to sweep fuel towards the secondary fuel orifice 358'. It will also be observed that, as in other embodiments of the invention already described, the primary and secondary fuel control orifices 358, 358' are located at an upstream end of chamber 344 relative to swirl flow direction F. On the other hand, air control orifices 360 and 360' are located towards a downstream end of the reaction chamber 344 relative to swirl flow direction F. The air control orifices are also located outside of the spray pattern S of fuel impinging the sidewall 354 so that the admission of fuel and air can be primarily controlled through the location and sizes of fuel control orifices 358, 358' and air control orifices 360, 360'. While only four orifices have been illustrated in this embodiment, it is to be understood that any number of discrete fuel and air control orifices could be utilized in accordance with the formula given above for the design index "I". Experimentation will determine the optimum size and locations of the orifices relative to the swirl flow direction F and relative to the geometry and location of the reaction chamber 344.

It should also be noted that, although a reaction chamber 344 extends only part way around the circumference 300 as illustrated, the chamber 344 could be a single annular chamber surrounding the recess area in piston 300. In such an embodiment of the invention, the same principles would apply regarding locating the fuel and air orifices relative to the fuel spray pattern.

Figure 12:
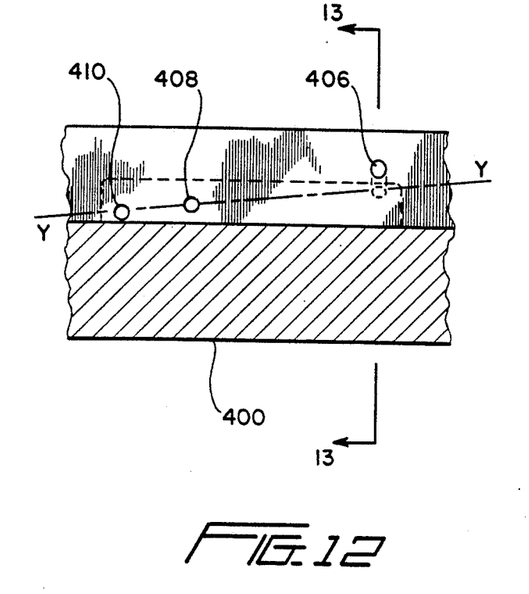
FIG. 12 is a schematic illustration of another preferred embodiment showing a different array of fuel and air discrete orifices in communication with a reaction chamber.
Figure 13:
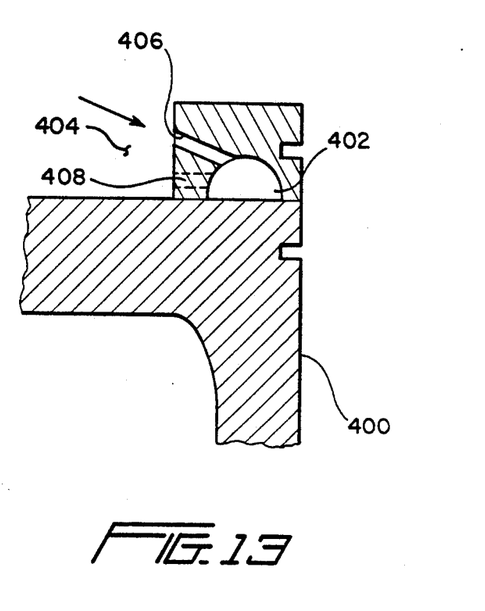
FIG. 13 is a section view taken along 13—13 of FIG. 12.

With reference to FIGS. 12 and 13, another embodiment of the invention is incorporated in a piston 400 having a reaction chamber 402 that communicates with the piston recess area 404 via a fuel control orifice 406 and air control orifices 408, 410. It has been discovered that it is advantageous to locate the air control orifices so that they lie in an imaginary plane that extends perpendicular to and radially of the imaginary longitudinal center line of symmetry of the piston 400. While two air control orifices 408, 410 are illustrated, in some applications it is possible to eliminate the second orifice 408 in favor of an orifice 410 disposed somewhat further from the fuel orifice 406 than orifice 408 would be. If a plurality of air control orifices 408, 410, etc. are utilized, it may be preferable to dispose them along a row extending along an imaginary line diagonally extending through the reaction chamber 402 (such an imaginary line is illustrated at Y—Y).

For some applications, it has been found to be advantageous to locate air control orifices 408, 410 towards the opposite ends of the reaction chamber 402 as well as vertically, separated as illustrated in FIGS. 11 and 12 in a direction parallel to the piston centerline to create somewhat chaotic, turbulent conditions within the reaction chamber 402 to promote better heat transfer of the fuel species in the chamber 402 and to mix the incoming liquid fuel and air in the chamber 402. Otherwise, the various design parameters and considerations discussed above apply equally to the embodiment of the invention illustrated in FIGS. 12 and 13.

Figure 14:
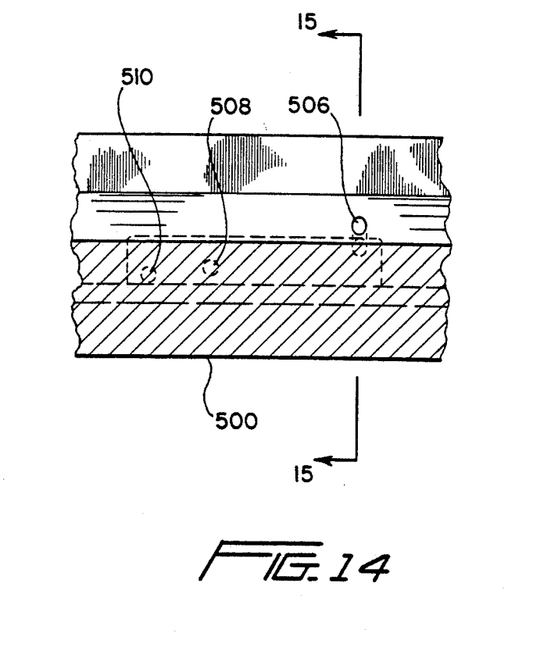
FIG. 14 shows another preferred embodiment of the invention.
Figure 15:
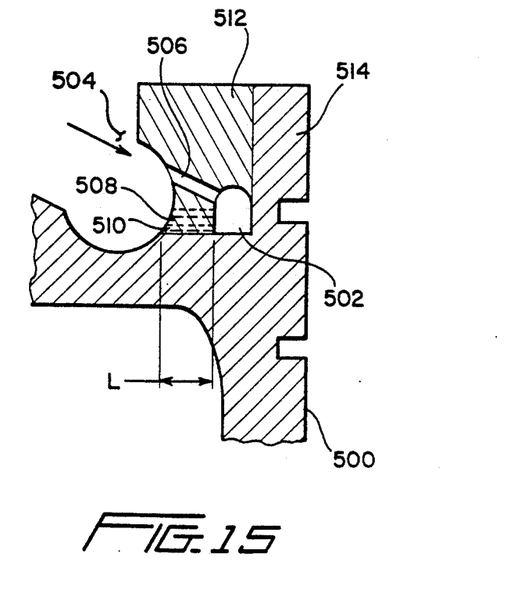
FIG. 15 is a section view taken along line 1513 15 of FIG. 14.

FIGS. 14 and 15 show an alternate embodiment of the invention, wherein piston 500 is provided with a reaction chamber 502 that communicates with recess 504 via fuel control orifice 506 and air control orifices 508, 510. For some applications, a single air to control orifice will be preferred, depending on experimental results for a given engine and combustion chamber design.

In a manner similar to the embodiments illustrated in FIGS. 12 and 13, air control orifices 508, 510 are disposed in an imaginary plane extending perpendicular to and transversely of the longitudinal center line of the piston 500. That is, they do not extend at an angle similar to the fuel orifice 504. In this embodiment, reaction chamber 502 may be formed by utilizing an insert 512 appropriately welded or secured to a longitudinally extending circumferential wall 514 of piston 500.

Figures 16, 17, 18, 19:
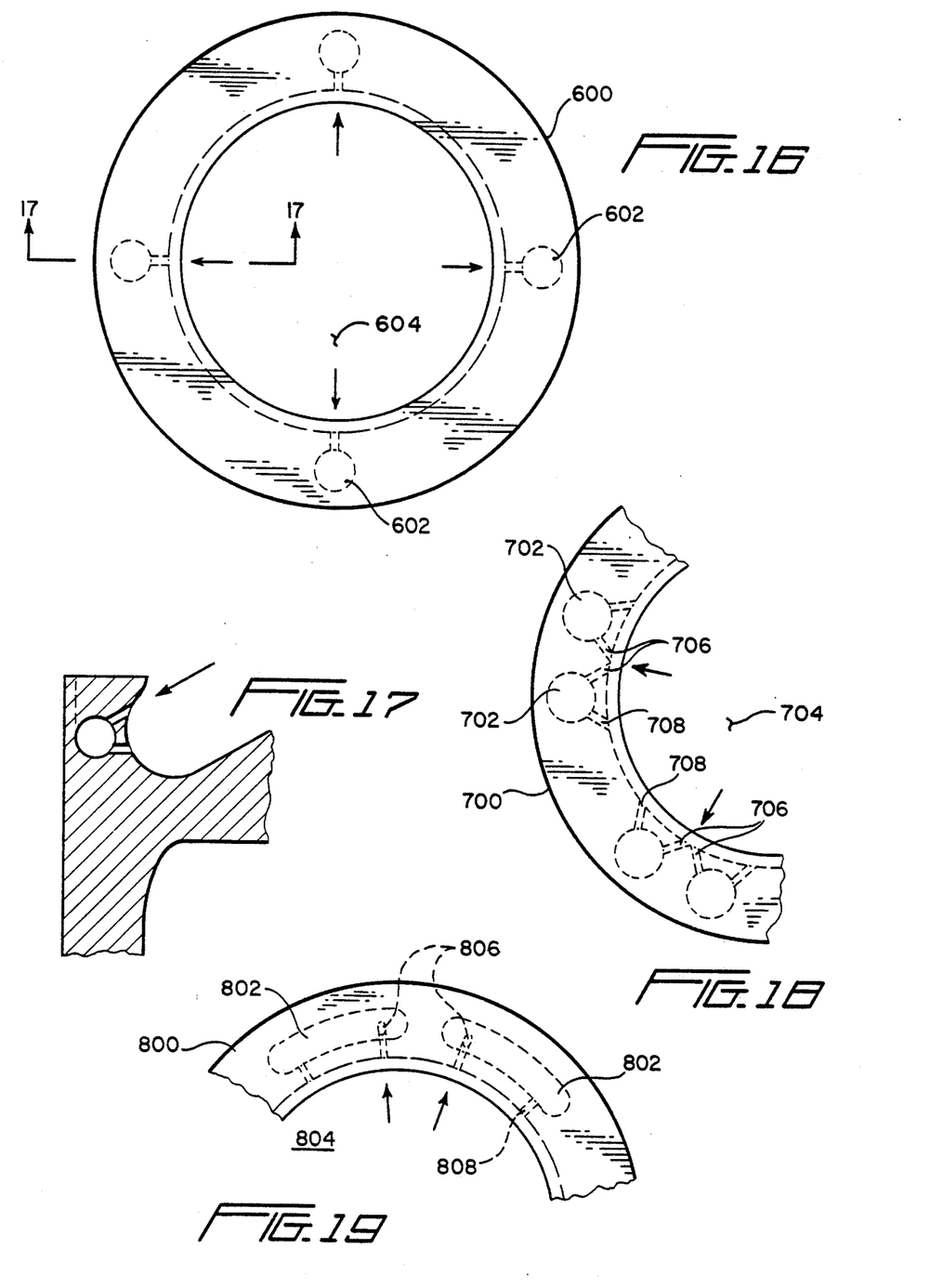
FIG. 16 shows another embodiment of the invention wherein the reaction chamber is spherical.
FIG. 17 is a sectional view taken along line 1713 17 of FIG. 16.
FIG. 18 shows another embodiment of the invention using a spherical reaction chamber.
FIG. 19 shows still another embodiment of the invention utilizing a different array of fuel and air discrete orifices.

It is to be noted in all embodiments that the length L of the air control orifices in particular may be critical to achieve appropriate timing of outflow of radicals from reaction chamber 502 into the combustion zone in recess 504 for certain engine applications. Of course, the dimensions of the air control orifices always must be calculated to achieve quenching of combustion flame front from the combustion zone towards the reaction chamber for any embodiment of the invention, In addition, length L can also be adjusted for some applications to regulate the timing of radicals exiting reaction chamber 502 to achieve seeding of a next incoming charge in the combustion .chamber of an engine incorporating the piston constructed in accordance with the invention, FIGS. 16 and 17 illustrate another preferred embodiment of the invention wherein the reaction chamber 602 is generally spherical rather than oblong. Actually, it will be understood that the spherical embodiment of the invention merely represents a small reaction chamber as compared with the oblong or toroidal shape illustrated in, for example, the embodiment of FIG. 2. For some applications it has been observed that a plurality of minimum volume reaction chambers function better than larger reaction chambers. Moreover, the smaller volume reaction chamber permits one to utilize any number of isolated reaction chambers disposed at various locations at the upper area of a piston. For example, while FIG. 1 6 only shows four symmetrically located reaction chambers 602, it should be understood that any desired number of reaction chambers could be disposed at various locations around the central recess 604 and the central recess 604 itself could disposed eccentric of the longitudinal center line of the piston 600.

FIG. 18 illustrates an embodiment wherein a piston 700 having a central recess 704 communicates with spherical reaction chambers 702 via fuel control orifices 706 that intersect the recess 704 at closely adjacent or co-terminus locations. The air control orifices 708 are spaced circumferentially from the exit end of the fuel control orifices 706 to avoid impingement of fuel in the vicinity of the air control orifice.

It will noted that, in accordance with the embodiment of FIG. 18, the direction of swirl of gases in the recess 704 will not affect the impingement of fuel spray with fuel control orifices 706 since the swirl flow will promote impingement with at least one set of fuel control orifices and one set of reaction chambers.

In accordance with the embodiment of FIG. 19, piston 800 is provided with a plurality of medium size reaction chambers 802 that communicate with the recess area 804 via fuel control orifices 806 and air control orifices 808. In this embodiment, the direction of swirl in recess area 804 will not adversely affect performance of the system because fuel impingement will always be assured with respect to at least one fuel control orifice 806 associated with a reaction chamber 802. Moreover, as is also true in the case of the embodiment illustrated in FIG. 18, if the fuel control orifices 806 are located close enough together, they both may receive liquid fuel from a single jet spray pattern of fuel.

The foregoing description is intended to be illustrative of preferred embodiments of the invention and is not intended to limit the invention in any manner. It will be apparent to persons skilled in the art that various modifications to the disclosed embodiments can be made without departing from the spirit and scope of the invention as defined in the claims below.

We claim:

1. In a piston for a reciprocating piston internal combustion engine in which a combustion cycle is carried out in a variable volume combustion chamber defined by the piston reciprocating in a close ended cylinder into which a fuel and air charge is periodically supplied, and which cycle includes intake, compression, combustion, expansion and exhaust portions, and wherein the piston crown includes a recess that contains the majority of the charge when the combustion chamber is at minimum volume, the improvement comprising:

said piston including at least one reaction chamber having a curvilinear sidewall in cross-section disposed in the piston crown area adjacent the periphery of the recess, and an array of discrete orifices including at least one fuel control orifice and at least one air control orifice, said array of discrete orifices providing the sole communication between the recess and the reaction chamber, said reaction chamber and orifices being shaped and dimensioned such that during the compression portion of each combustion cycle, a portion of the charge is admitted into the reaction chamber through the orifices, with the flow of any gaseous portion of the charge being choked during at least part of the compression event; the charge admitted to the reaction chamber is vortically swirled in intimate contact with the sidewalls of the reaction chamber so as to effect heat transfer to the admitted charge and its partial oxidation reaction to create radical species of the fuel; any flame front approaching the reaction chamber from the combustion chamber is quenched; outward flow of compressible gas with radicals from the reaction chamber into the combustion chamber during each combustion cycle through the orifices is choked during at least part of the expansion and exhaust portions of each combustion cycle; radicals of the fuel are produced and retained temporarily in the reaction chamber during the combustion, expansion and exhaust portions of the combustion cycle and are discharged into the piston recess following the conclusion of said exhaust portion at in advance of the compression portion of the succeeding combustion cycle in sufficient quantity to condition the succeeding charge in the combustion chamber for preselected ignition and combustion characteristics, and with said at least one fuel control orifice being located so as to control admission of primarily fuel to the reaction chamber during each combustion cycle and said at least one air control orifice being arranged to control admission of primarily air to the reaction chamber during each combustion cycle, said respective fuel and air control orifices intersecting the reaction chamber at separate locations, and means for directing a portion of fuel of each charge towards the fuel control orifice, with said air control orifice being located so as to receive primarily air during each charge intake and compression portion of each combustion cycle.

2. The improvement as claimed in claim 1, wherein said means for directing a portion of fuel of each Charge towards the fuel control orifices comprises a fuel injector arranged to directly inject liquid fuel into the piston recess and includes a nozzle arranged to direct a portion of the fuel ejected from the injection nozzle in the direction of said fuel control orifice.

3. The improvement as claimed in claim 2, including a channel associated with said fuel control orifice providing communication between said fuel control orifice and said reaction chamber, the orientation of said channel corresponding to approximately the angle of impingement of fuel from said fuel injector towards said one fuel control orifice.

4. The improvement as claimed in claim 1, 2 or 3 wherein said fuel and air control orifices are circumferentially spaced about the piston recess, and including means for swirling each incoming charge in a generally circular path in the piston recess during each combustion cycle, and wherein said fuel control orifice is located upstream of the swirl direction relative to the air control orifice.

5. The improvement as claimed in claim 1, 2 or 3, wherein said recess is delimited by generally axially extending sidewalls and wherein said fuel control orifice is arranged to provide communication between said reaction chamber and a portion of said generally axially extending sidewalls.

6. The improvement as claimed in any one of claims 1, 2 or 3 including means for carrying out the generation of radical species in the reaction chamber during each combustion cycle in accordance with the formula:

$$R_{OUT} = R_{GEN.} + R_{IN} - R_{RET.} \geq R_{CRIT.}$$

where:
$R_{OUT}$ = radical species discharged from the reaction chamber into the piston recess;
$R_{GEN.}$ = radical species generated during each combustion cycle in the reaction chamber;
$R_{IN}$ = seeded radicals from the combustion chamber returned to the reaction chamber during the compression of the seeded charge;
$R_{RET.}$ = radicals retained in the reaction chamber each combustion cycle;
$R_{CRIT.}$ = the minimum quantity of radical species in the reaction chamber required to consistently seed a charge in the combustion chamber each combustion cycle so as to obtain desired preselected ignition and combustion characteristics of the charge.

7. The improvement as claimed in claim 1 wherein the relationship between total reaction chamber volume ($V_B$) and combustion chamber volume ($V_A$) is in accordance with the formula:

$$\frac{V_B}{V_A} = 0.01 \text{ to } 0.20.$$

where $V_A$=total combustion chamber clearance volume at piston TDC, minus $V_B$.

8. The improvement as claimed in claim 1 or 2, including a catalyst material disposed in a reaction chamber, said catalyst material promoting generation of said radical species of fuel.

9. The improvement as claimed in claim 8, wherein said catalyst material is coated on the reaction chamber wall surfaces.

10. The improvement as claimed in claim 1 or 2, including a secondary fuel control orifice disposed closely adjacent said fuel control orifice, and wherein said means for directing a portion of fuel of each charge towards the fuel control orifice also directs a portion of the fuel of each charge towards said secondary fuel control orifice at least during certain predetermined engine operating conditions.

11. The improvement as claimed in claim 1, including at least one secondary air control orifice located so as to receive primarily air during each combustion cycle.

12. The improvement as claimed in claim 10, including at least one secondary air control orifice located so as to receive primarily air during each combustion cycle.

13. The improvement as claimed in claim 1, wherein said air control orifice intersects the piston crown area.

14. The improvement as claimed in claim 4, wherein said reaction chamber is circumferentially elongated and said fuel and air control orifices are located towards opposite ends of the reaction chamber.

15. The improvement as claimed in claim 14, including at least two air control orifices that are circumferentially spaced apart.

16. The improvement as claimed in claim 15, wherein at least two of said air control orifices are also longitudinally spaced apart relative to the piston longitudinal axis.

17. The improvement as claimed in claim 14, wherein said fuel and air control orifices are longitudinally spaced apart relative to the piston longitudinal axis.

18. In a piston for a reciprocating piston internal combustion engine in which a combustion cycle is carried out in a variable volume combustion chamber defined by the piston reciprocating in a close ended cylinder into which a fuel and air charge is periodically supplied, and which cycle includes intake, compression, combustion, expansion and exhaust portions, and wherein the piston crown includes a recess that contains the majority of the charge when the combustion chamber is at minimum volume, the improvement comprising:
said piston including at least one reaction chamber having a curvilinear sidewall in cross-section disposed in the piston crown area adjacent the periphery of the recess, and an array of discrete orifices providing the sole communication between the recess and the reaction chamber, said reaction chamber and orifices being shaped and dimensioned such that during the compression part of each combustion cycle, a portion of the charge is admitted into the reaction chamber through the orifices with the flow of any gaseous portion of the charge being choked during at least part of the compression event; the charge admitted to the reaction chamber is radially vortically swirled in intimate contact with the sidewall of the reaction chamber, so as to effect heat transfer to the admitted charge and its partial oxidation reaction to create radical species of the fuel; any flame front approaching the reaction chamber from the combustion chamber is quenched; and outward flow of compressible gas with radicals from the reaction chamber into the combustion chamber through the orifices is choked during at least part of the expansion and exhaust portions of each combustion cycle; and radicals of the fuel are produced and retained temporarily in the reaction chamber during the combustion, expansion and exhaust portions of a combustion cycle and are discharged into the piston recess following the conclusion of the exhaust portion at least in advance of the compression portion of the succeeding combustion cycle in Sufficient quantity to condition the next succeeding charge in the combustion chamber for preselected ignition and combustion characteristics.

19. The improvement as recited in claim 18, wherein said recess is delimited by at least one generally axially extending sidewall, and said array includes at least one discrete orifice in communication with a portion of said at least one sidewall.

20. The improvement as claimed in claim 19, wherein said array includes at least a second discrete orifice in communication with the piston crown outside said recess.

21. The improvement as claimed in claim 18 or 19, including a charge preparation means, an intake manifold providing communication between the charge preparation means and the combustion chamber, a charge intake control valve means for periodically admitting charge to the combustion chamber and a spark igniter in the combustion chamber for igniting a charge periodically admitted to the combustion chamber from the charge preparation means.

22. The improvement as claimed in claim 21, including means for causing axial stratification of the charge in the combustion chamber.

23. The improvement as claimed in claim 1 or 3, Wherein said piston is symmetrical about a longitudinal center line and said air control orifice extends in an imaginary plane extending perpendicular to and radially of the longitudinal center line of the piston.

24. The improvement as claimed in claim 1, wherein said reaction chamber is substantially spherical.

25. The improvement as claimed in claim 20, including a plurality of spherical reaction chambers, and wherein the fuel control orifices of adjacent reaction chambers intersect the piston recess closely adjacent each other.

26. The improvement as claimed in claim 1, wherein said reaction chamber is circumferentially elongate, and said fuel and air control orifices intersect the reaction chamber at circumferentially spaced locations.

27. The improvement as claimed in claim 1, including a plurality of reaction chambers spaced circumferentially about the piston crown area, and wherein the fuel control orifices of adjacent reaction chambers are disposed adjacent each other and the air control orifices of adjacent reaction chambers are disposed on either side of said fuel control orifices.

28. A process of radical seeding of a charge in a combustion chamber of an air breathing reciprocating piston type internal combustion engine including a piston having a recess area at its crown area defining the major part of the combustion chamber volume at the minimum volume condition, and a fuel supply system arranged to supply fuel into the combustion chamber to carry out a combustion cycle including intake, compression, combustion, expansion and exhaust portions comprising:

providing a reaction chamber having a curvilinear chamber sidewall in cross section in the piston crown area adjacent the periphery of the recess and extending at least part way around the outer periphery of the recess area;

providing an array of discrete orifice including at least one fuel control orifice and at least one air control orifice, said array of discrete orifices providing the sole communication between the reaction chamber and the recess area with at least one orifice intersecting said curvilinear chamber sidewall tangentially so that a radial vortical flow is induced in the reaction chamber when fluid flow is induced in the reaction chamber from the recess area through said one orifice during each compression stroke of the piston;

directing fuel of each charge during each combustion cycle to said at least one fuel control orifice and controlling the admission of primarily fuel to the reaction chamber through said fuel control orifice, and utilizing said at least one air control orifice which is spatially separated from the fuel control orifice to control the admission of primarily air into the reaction chamber;

selecting orifice dimensions, configuration and location such that combustion flames from the combustion chamber are quenched by the orifices before they can extend into the reaction chamber and such that inflow and outflow of compressible gases to and from the reaction chamber from and to the recess area are choked due to differential pressure conditions existing across the orifices during part of the expansion, exhaust and compression portions of each combustion cycle, so that the pressure fluctuations in the reaction chamber always lag behind the pressure fluctuations in the combustion chamber and so that radicals generated in the reaction chamber during a combustion cycle are partially retained in the reaction chamber during the combustion, expansion and exhaust portions of the combustion cycle and are partially discharged into the recess area near the start of the compression portion of the succeeding combustion cycle;

carrying out each combustion cycle by directing at least a portion of the fuel charge for each cycle into the reaction chamber and partially cool flame oxidizing the charge in the reaction chamber to generate radical fuel species while the charge is vortically swirled in intimate contact with the chamber sidewalls, and by discharging a portion of the radicals generated in the reaction chamber into the recess through said orifice array under said choked outflow conditions;

carrying out the generation of radicals in the reaction chamber and controlling the generation of radicals within the reaction chamber in accordance with the formula:

$$R_{OUT} = R_{GEN.} + R_{IN} - R_{RET.} \geq R_{CRIT.}$$

where:
$R_{OUT}$ = radicals discharged from the reaction chamber into the piston recess area;
$R_{GEN.}$ = radicals generated during each combustion cycle in the reaction chamber;
$R_{IN}$ = seeded radicals returned to the reaction chamber from the combustion chamber during compression of a charge;
$R_{RET.}$ = radicals retained in the reaction chamber;
$R_{CRIT}$ = the minimum quantity of radical species of fuel in the reaction chamber required to obtain preselected ignition and combustion characteristics of the charge each combustion cycle.

29. The process as claimed in claim 28, including directly injecting liquid fuel into the recess area of the piston during a portion of each combustion cycle and initiating the combustion by compression ignition, and wherein the preselected ignition characteristics comprise consistent, predictable ignition timing during each combustion cycle.

30. The process as claimed in claim 29, including directing a portion of the injected liquid fuel towards said fuel control orifice while maintaining said air control orifice outside of an area of injected fuel impingement.

* * * * *